(12) United States Patent
Mortensen et al.

(10) Patent No.: US 9,249,708 B2
(45) Date of Patent: Feb. 2, 2016

(54) NOZZLE ARRANGEMENT (75) Inventors: Peter Rosenbeck Mortensen, Farum (DK); Niels Torp Madsen, Valby (DK); Andreas Aabroe Gamborg, København (DK)

(73) Assignee: GRUNDFOS NONOX A/S, Bjerringbro (DK)

( * ) Notice: Subject to any disclaimer, the term of this patent is extended or adjusted under 35 U.S.C. 154(b) by 1229 days.

(21) Appl. No.: 12/746,146

(22) PCT Filed: Dec. 4, 2008

(86) PCT No.: PCT/DK2008/050286
§ 371 (c)(1),
(2), (4) Date: Dec. 17, 2010

(87) PCT Pub. No.: WO2009/071088
PCT Pub. Date: Jun. 11, 2009

(65) Prior Publication Data
US 2011/0095105 A1    Apr. 28, 2011

(30) Foreign Application Priority Data

Dec. 5, 2007    (DK) .................................. 2007 01733

(51) Int. Cl.
*B05B 1/26*    (2006.01)
*B05B 1/02*    (2006.01)
(Continued)

(52) U.S. Cl.
CPC ............ *F01N 3/2066* (2013.01); *F01N 2570/14* (2013.01); *F01N 2610/02* (2013.01); *F01N 2610/14* (2013.01); *F01N 2610/1453* (2013.01); *Y02T 10/24* (2013.01)

(58) Field of Classification Search
CPC ......... F01N 3/20; F01N 3/2033; F01N 3/206; F01N 3/208; F01N 13/08; F01N 3/203; B05B 1/26; B05B 1/02; B05B 1/14; B05B 1/3436
USPC ............ 239/559, 567, 589, 596, 601; 60/286, 60/295, 301, 303
See application file for complete search history.

(56) References Cited

U.S. PATENT DOCUMENTS 1,045,469 A * 11/1912 Van Zandt .............. B05B 1/185
239/559
2,800,291 A * 7/1957 Stephens ....................... 244/200
(Continued)

FOREIGN PATENT DOCUMENTS

DE          198 55 385  A1    6/2000
DE    10 2004 048 075  A1    4/2006
(Continued)

*Primary Examiner* — Arthur O Hall
*Assistant Examiner* — Joseph A Greenlund
(74) *Attorney, Agent, or Firm* — Knobbe Martens Olson & Bear LLP (57) ABSTRACT

The present invention relates to a system preferably being an exhaust system or a part of a system such as a part of an exhaust system for a combustion engine. The system or the part of the system comprising a pipe (1) through which a fluid, such as exhaust gasses, flows; a nozzle (3) adapted to atomize a liquid, being disposed. to crystallize as a result of contact with the fluid and adapted to introduce the liquid through one or more outlets into the pipe (1). The nozzle (3) being arranged so that the region being sprayed and/or the mixing region in which a mixing between the liquid being atomized by the nozzle and the fluid flowing in the pipe occur is/are flushed by fluid flowing through the pipe.

17 Claims, 9 Drawing Sheets

(51) Int. Cl.
 *B05B 1/14* (2006.01)
 *F01N 3/20* (2006.01)
 *F01N 13/08* (2010.01)

(56) References Cited

U.S. PATENT DOCUMENTS

| | | | | |
|---|---|---|---|---|
| 3,578,264 | A * | 5/1971 | Kuethe | 244/200.1 |
| 4,789,117 | A * | 12/1988 | Paterson et al. | 244/130 |
| 5,116,579 | A * | 5/1992 | Kobayashi | B01D 53/9409 422/111 |
| 5,605,042 | A * | 2/1997 | Stutzenberger | B01D 53/9431 60/286 |
| 6,041,594 | A * | 3/2000 | Brenner | B01D 53/90 239/427.5 |
| 6,098,896 | A * | 8/2000 | Haruch | B01J 8/1827 239/432 |
| 6,293,097 | B1 * | 9/2001 | Wu et al. | 60/286 |
| 6,382,600 | B1 * | 5/2002 | Mahr | B01D 53/9431 261/115 |
| 6,449,947 | B1 * | 9/2002 | Liu et al. | 60/286 |
| 6,513,323 | B1 * | 2/2003 | Weigl | B01D 53/9431 137/340 |
| 7,500,356 | B2 * | 3/2009 | Hirata | B01D 53/9431 222/149 |
| 7,571,603 | B2 * | 8/2009 | Ripper | B01D 53/90 222/145.5 |
| 2001/0015067 | A1 * | 8/2001 | Darley | F01M 13/02 60/303 |
| 2002/0162322 | A1 * | 11/2002 | Ganzmann et al. | 60/286 |
| 2003/0101713 | A1 * | 6/2003 | Dalla Betta et al. | 60/284 |
| 2004/0178287 | A1 * | 9/2004 | Okamoto et al. | 239/596 |
| 2004/0206070 | A1 * | 10/2004 | Shirakawa | F01N 3/0814 60/285 |
| 2004/0237511 | A1 * | 12/2004 | Ripper et al. | 60/286 |
| 2005/0172615 | A1 * | 8/2005 | Mahr | 60/286 |
| 2006/0275192 | A1 * | 12/2006 | Gabrielsson et al. | 423/235 |
| 2007/0035832 | A1 * | 2/2007 | Hirata et al. | 359/484 |
| 2008/0202104 | A1 * | 8/2008 | Ichikawa | F01N 3/2066 60/295 |
| 2009/0133383 | A1 * | 5/2009 | Shost | F01N 3/2066 60/276 |
| 2009/0255242 | A1 * | 10/2009 | Paterson | B01F 3/02 60/320 |
| 2009/0288396 | A1 * | 11/2009 | Sakata | F01N 3/208 60/286 |
| 2011/0095105 | A1 * | 4/2011 | Mortensen | F01N 3/2066 239/601 |
| 2011/0239631 | A1 * | 10/2011 | Bui | F01N 3/2066 60/295 |
| 2012/0085085 | A1 * | 4/2012 | Wright | F01N 3/2066 60/295 |

FOREIGN PATENT DOCUMENTS

| | | |
|---|---|---|
| DE | 10 2006 003 786 A1 | 5/2007 |
| DE | 102006024944 A1 * | 12/2007 |
| DE | 10 2007 049 850 A1 | 4/2009 |
| EP | 1 741 889 A1 | 1/2007 |
| EP | 1 748 162 A1 | 1/2007 |
| EP | 1741889 A1 * | 1/2007 |
| EP | 1748162 A1 * | 1/2007 |
| FR | 2 897 646 A3 | 8/2007 |
| WO | WO 2005/103459 A1 | 11/2005 |
| WO | WO 2006014129 A1 * | 2/2006 |
| WO | WO 2006/050547 A1 | 5/2006 |
| WO | WO 2006/084570 A1 | 8/2006 |
| WO | WO 2007/036347 A1 | 4/2007 |

* cited by examiner

NOZZLE ARRANGEMENT

CROSS REFERENCE TO RELATED APPLICATIONS

This application claims the benefit of priority to and is a U.S. National Phase Application of PCT International Application Number PCT/DK2008/050286, filed on Dec. 4, 2008, designating the United States of America and published in the English language, which is an International Application of and claims the benefit of priority to Danish Patent Application No. PA 2007 01733, filed on Dec. 5, 2007. The disclosures of the above-referenced applications are hereby expressly incorporated by reference in their entireties.

FIELD OF THE INVENTION

The present invention relates to delivery of a fluid into a flowing fluid, and in particular to delivery of a reducing agent into an exhaust system of a combustion engine.

BACKGROUND OF THE INVENTION

In order to remove nitrogen oxides from the exhaust gasses of combustion engines, reducing agents such as liquefied urea is often introduced into the exhaust systems. This is typically done by use of a nozzle that ensures atomization of the reducing agent. However, the introduction of reducing agents often results in deposits in the form of crystals or amorphous structures building up in the nozzles used to deliver the reducing agent or in the exhaust pipes and/or on surfaces of the exhaust system. These deposits grow in size over time and thereby result in a poorer atomization and a poorer control of the delivered amount. They must therefore be removed from time to time which requires dismantling of parts of the system.

In accordance with the present invention, it has been realized that formation of deposits often occurs in regions of the exhaust system where recirculation regions are present. Formation of deposits may also occur where so-called initiating points are present, which initiating points are regions of a wall into which the atomized reducing agent flows towards and contacts and where depositing is initiated and grows out from. Initiating points are often burrs, cams, projections, knobs, high spots or the like.

Hence, an improved system and method for removal of nitrogen oxides from exhaust gasses without build-up of deposit would be advantageous.

OBJECT OF THE INVENTION

It is an object of the present invention to mitigate at least some of the disadvantages pertaining to deposits resulting from delivery of a fluid into a stream of fluid.

It is a further object of the present invention to provide an alternative to the prior art.

SUMMARY OF THE INVENTION

Thus, the above described object and several other objects are intended to be obtained in a first aspect of the invention by providing a system preferably being an exhaust system or a part of a system such as a part of an exhaust system for a combustion engine, the system or the part of the system comprising a pipe through which a fluid, such as exhaust gasses, flows
a nozzle adapted to atomize a liquid, being disposed to crystallize as a result of contact with the fluid flowing through the pipe and adapted to introduce the liquid through one or more outlets into the pipe, wherein the nozzle being arranged so that
the region being sprayed and/or
the mixing region in which a mixing between the liquid being atomized by the nozzle and the fluid flowing in the pipe occur is/are flushed by fluid flowing through the pipe.

The term regions being sprayed is preferably used to designate the region receiving the atomized liquid from the spraying action of the nozzle; the region may include wall parts of the pipe.

The term mixing regions is preferably used to designate the region in which the atomized liquid, such as liquefied urea, is yet not fully evaporated (converted) to gas and/or preferably the region in which the atomized liquid does not yet have the same velocity and direction as the fluid flowing through the pipe. The mixing regions extend typically 1 m or 10 pipe diameters downstream of the opening of the nozzle particularly when an exhaust system with introduction of liquefied urea is considered The term flushed is preferably used to designate the transportation of atomized liquid (drops), such as liquefied urea (drops), by the fluid flowing in the pipe away from the regions in question.

When referring to the orientation of a nozzle plate here and in the following, it is assumed that the thickness of the plate is significantly smaller than the dimensions perpendicular thereto, and the orientation refers to the orientation of the plane which extends perpendicular to the thickness direction. A corresponding understanding is to be applied even if the thickness is of the same order of magnitude as the other dimensions, such as a diameter of a circular plate.

Although the invention is disclosed in connection with feeding liquefied urea to an exhaust system of a combustion engine it is envisaged that the invention is applicable in a broader sense and with other fluids.

BRIEF DESCRIPTION OF THE FIGURES

The system and method used to deliver a fluid into a stream of a fluid according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
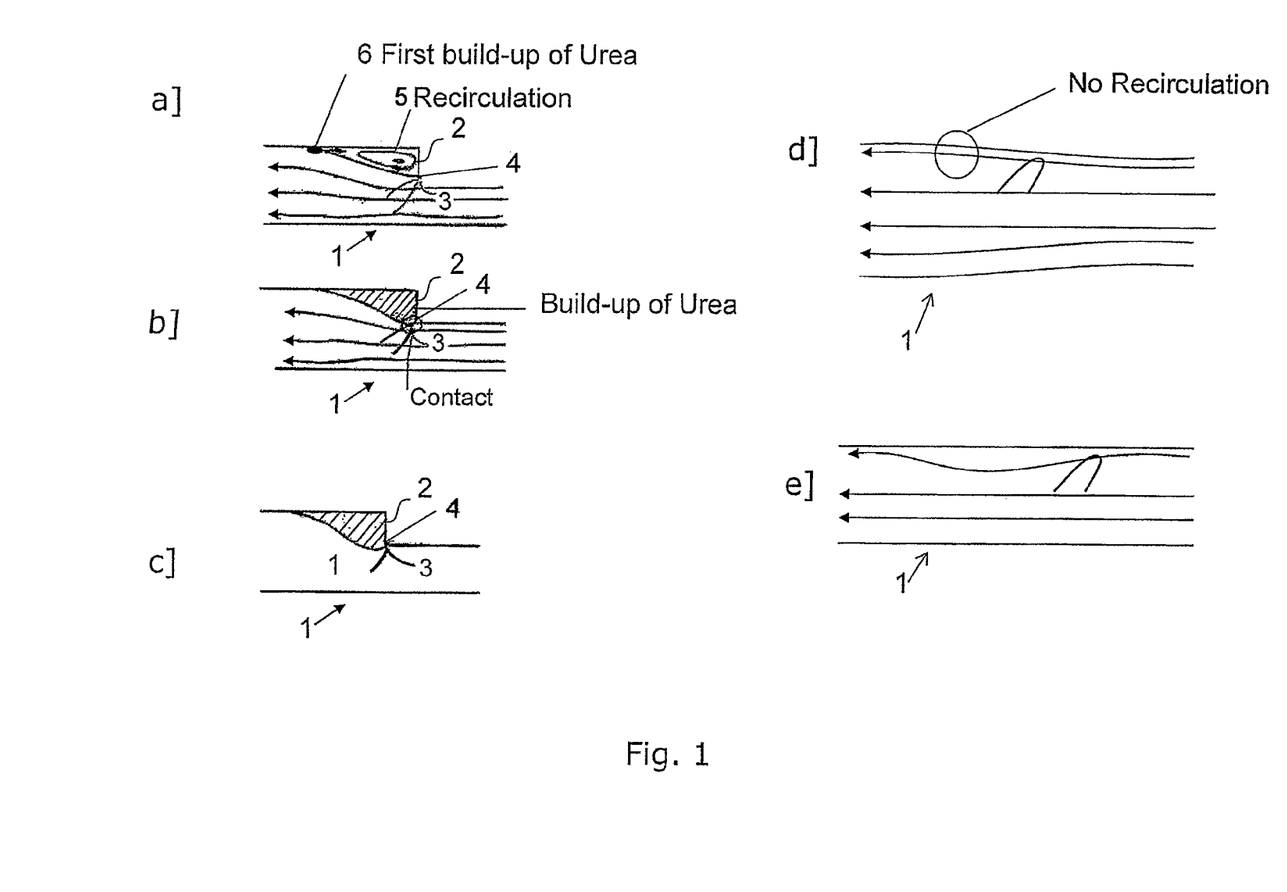
FIG. 1 is a schematic illustration of various flow regimes related to the present invention.

FIG. 1 shows schematically various flow regimes related to the present invention. FIG. 1*a-c* shows a flow regime which is aimed at being avoided.

FIG. 1 shows in particular a flow pipe 1 in a cross-sectional view being a part of an exhaust pipe running from the engine and to a catalytic system. The pipe 1 is tubular shaped and comprises a sharp increase in cross-sectional area in the stream wise direction in form of a step 2. A nozzle 3 is arranged at the corner 4 of the step 2.

The nozzle receives fluidised urea and spray a mist of droplet into pipe 1 and thus into the exhaust gasses which flow from right to left in the figures. These droplets are exposed to a force from the flow of the exhaust gasses which force tends to grip the droplets and force them in the direction of the flow of the exhaust gas—this effect being, of course, depending on a number of factors such as size of droplet, velocity and direction of the droplets when they leave the nozzle, and momentum of the exhaust gas. However, the velocity and direction of the droplets are balanced against the momentum of the exhaust gasses so that droplets are not sprayed onto the opposite wall of the pipe as this would cause unwanted deposits thereon. Thus, the droplets are picked up by the exhaust gas and travels with the exhaust gas downstream in the pipe.

In the stepped pipe shown in FIG. 1*a-c*, the step will create a recirculation region (the Reynolds number are considered to be so high that a creeping flow is not present). Particles present in streamlines outside the recirculation region 5 will have a tendency to flow into the recirculation region and flow towards the region labelled 6 of the wall where initial depositing occurs. Once such initial depositing has occurred a further build up of urea will take place in a direction upstream into the recirculation region so as to fill the recirculation region with deposits as indicated FIG. 1*b*.

After the recirculation region has been filled with deposits, the depositing continues and the front of the deposits reaches the outlet of the nozzle resulting in that the nozzle sprays directly into the deposits which situation eventually end with a clogging of the nozzle (FIG. 1*c*).

FIGS. 1*d* and *e* shows two examples according to the present invention in which the build up of deposits are avoided or at least the risk for depositing is made dramatically smaller.

In FIG. 1*d* the pipe 1 is formed as a diffuser wherein the cross-sectional area evolves in a smooth manner to provide an enlargement of the cross section. In this example smooth is defined so that recirculation does not occur in the region where the cross section expands at least when no spraying from the nozzle occur.

As indicated in FIG. 1*d*, the spray of droplets into the exhaust gasses will have a tendency to skew the flow so that the flow of exhaust gasses is forced towards, the wall opposite to the wall where the nozzle is arranged. However, the skewness is not sufficient to generate a recirculation region and the flow of exhaust gasses is attached to the wall of the diffuser.

A similar skewness is present in the example shown in FIG. 1*e*. In this example the pipe is also tubular shaped but has a constant cross section at least in the region where the droplets are introduced into the exhaust gasses. Also in this example the flow stays attached in the region where the droplets entrain the flow of exhaust gasses.

In the above disclosed scenarios, the temperature of the walls of the pipes is considered to be low, typically lower than 152° C. If the temperature of the walls is higher, typically above the evaporation temperature of the liquid of the droplet, which in case of liquefied urea means above 152° C., depositing of urea caused by droplets of urea hitting the walls may be avoided. This is due to evaporation of the droplets hitting the walls with no or only very limited formation of crystallisation of urea as deposits. This is due to the drops impacting the hot walls will bounce of on a vapour layer and re-enter the gas stream. Urea not solute in water will evaporate at 152° C. and convert to ammonia and iso-cyanuric acid gas.

Thus, when the nozzle is arranged in a region where the temperature of the wall is higher than the evaporation temperature of the liquid, it may not crucial to avoid spraying droplets directly to the wall as such droplet will evaporate and the exhaust gasses will flush the region being sprayed.

The temperature of the walls of the exhaust system will during start-up be lower than the evaporation temperature of the liquid and if the nozzle is arranged so that droplets hitting the walls may occur, it may be decided that the atomization not performed until the temperature has increased to the desired level. This may e.g. be controlled by arranging a temperature sensor in the exhaust system measuring the temperature of the wall and signalling the temperature to a controlling unit which controls the feed of fluid to the nozzle so that the nozzle only delivers droplets of fluid when the temperature is above the desired level. In a particular preferred embodiment where urea is dosed, the temperatures of the exhaust gasses is measured at the inlet and at the outlet of the catalytic converter and these temperatures are used to control when the urea is to be dosed into the system. In a preferred embodiment, dosing is initiated when the temperature measured in the inlet of the catalytic converter is higher than 200° C., or when the both the temperature at the inlet and outlet of the catalytic converter is above 200° C.

The exhaust system comprises a catalytic unit arranged downstream of the nozzle. The nozzle should be placed as far away from the catalytic unit as possible to allow the liquid urea drops to fully vaporise. Preferable more than 10 times the diameters or 1000 mm, which ever one is the largest.

The surface of the wall of the pipe should be smooth, in the sense that no burrs, sharps edges etc are present.

Figure 2:
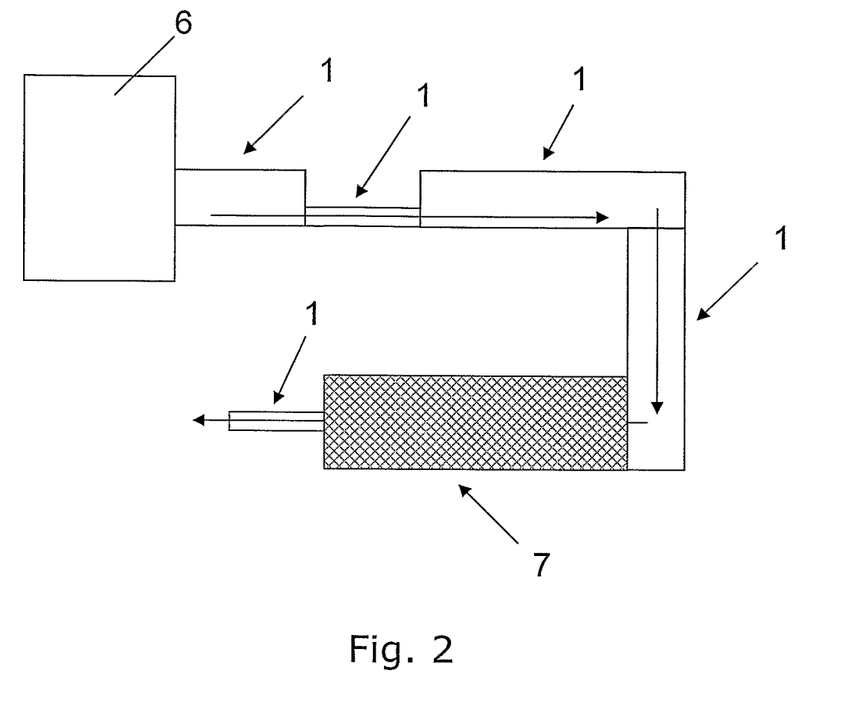
FIG. 2 shows schematically a combustion engine with exhaust system.

FIG. 2 shows schematically an exhaust system which comprises sharp corners edges etc wherein the risk of urea depositing on the surfaces are present. The exhaust system comprises an exhaust pipe 1—or a number of exhaust pipe pieces 1—extending from a motor 6 and to a catalytic converter 7.

Figure 3A:
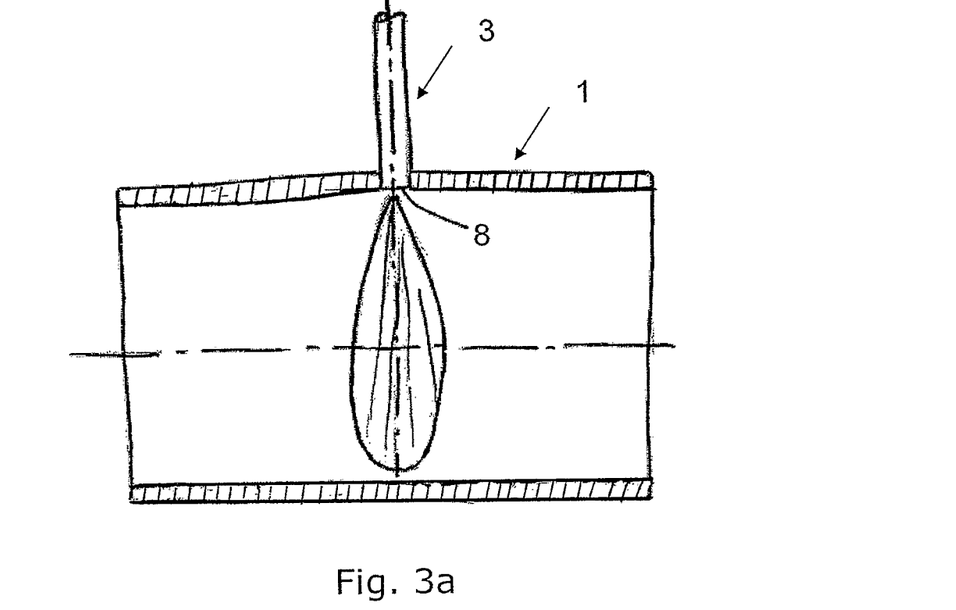
FIG. 3 shows schematically a longitudinal cross-sectional view of an embodiment of 25 embodying a nozzle into a straight part of an exhaust pipe according to the present invention.
Figure 3B:
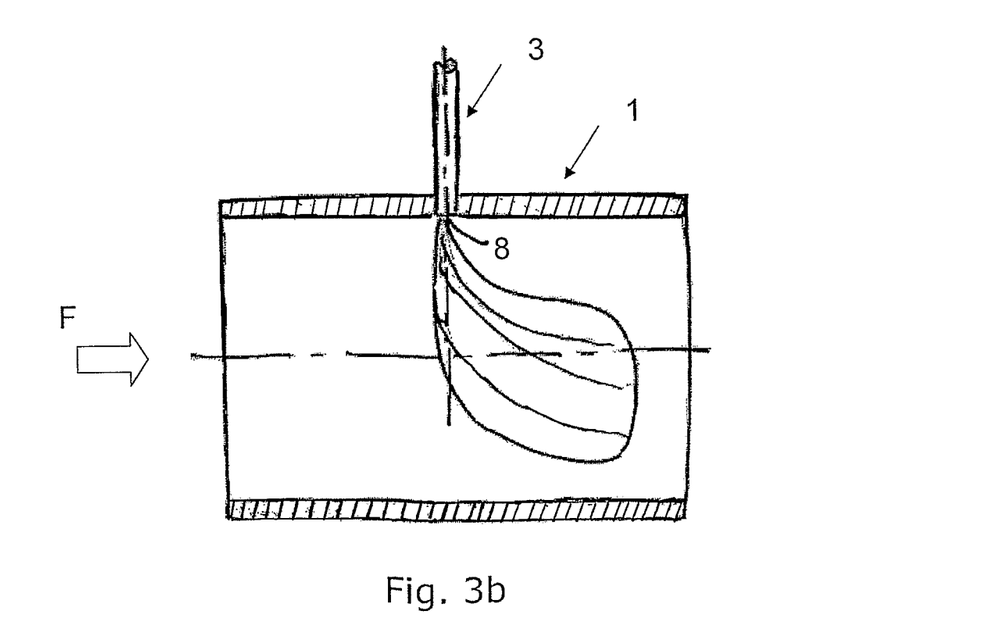
Figure 4A:
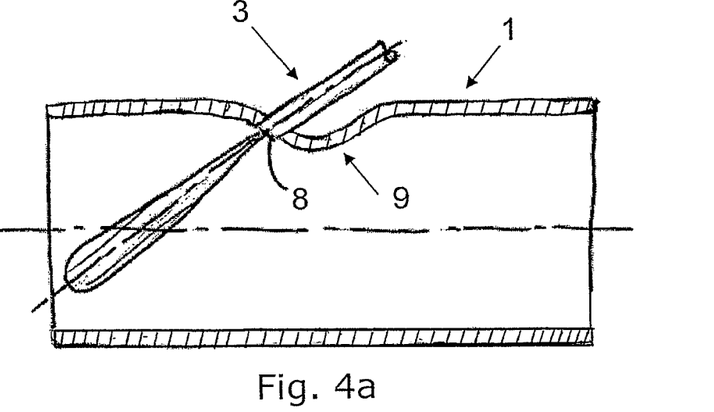
FIG. 4 shows schematically a longitudinal cross-sectional view of a further embodiment of embodying a nozzle into a straight part of an exhaust pipe 30 according to the present invention
Figure 4B:
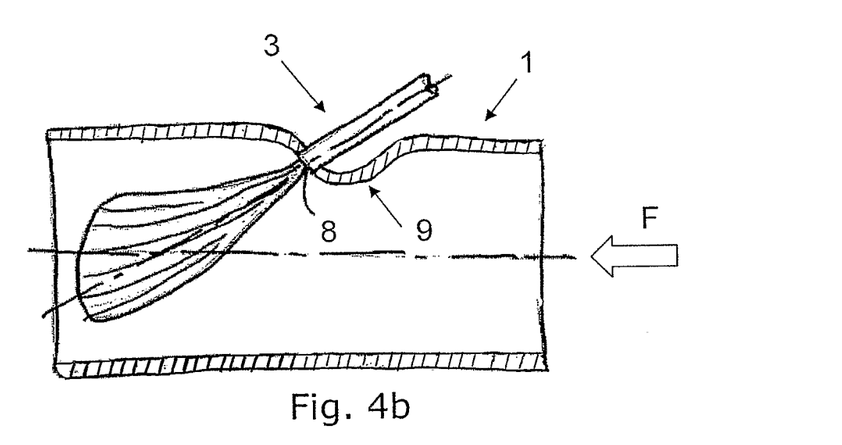
Figure 4C:
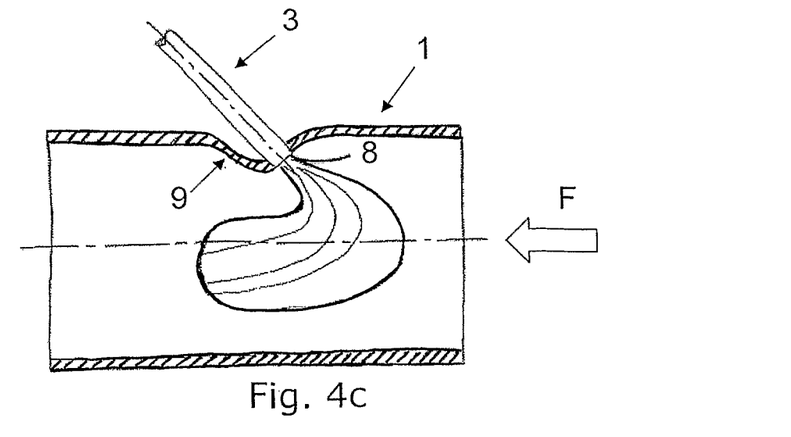
Figure 4D:
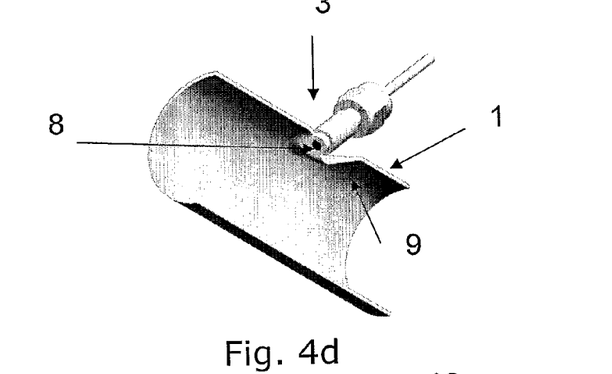
Figure 5A:
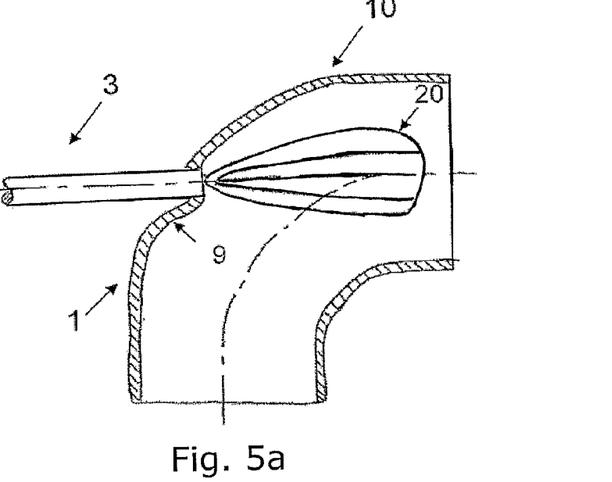
FIG. 5 shows schematically a longitudinal cross-sectional view of an embodiment of embodying a nozzle into a bend in an exhaust pipe according to the present invention.
Figure 5B:
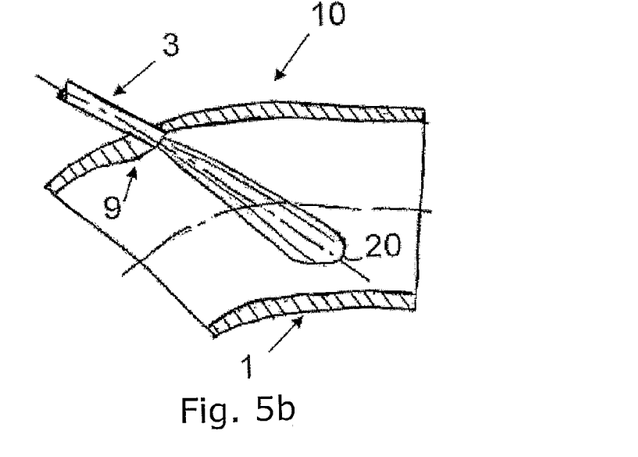
Figure 5C:
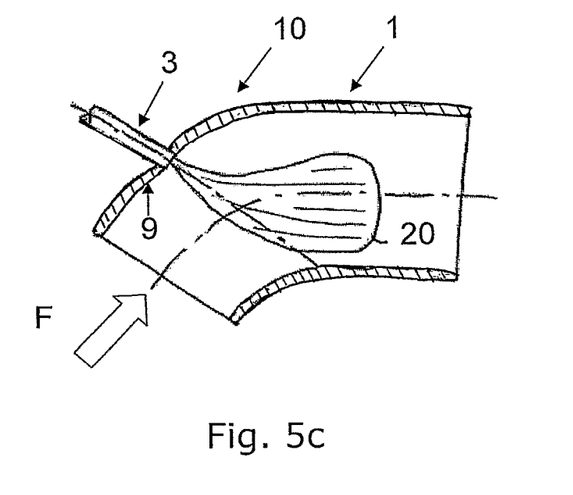

FIG. 3*a* shows schematically a longitudinal cross-sectional view of an embodiment of embodying a nozzle into a straight part of an exhaust pipe according to the present invention. In the embodiment of FIG. 3, the outlet end 8 of the nozzle 3 is shaped and arranged so as to reflect the shape of the inner surface of the pipe 1 so that the outlet end 8 of the nozzle 3 is at the same level as the inner surface of the pipe 1 when the nozzle 3 is arranged in the pipe 1. In some embodiment, the outlet end of the nozzle 3 is constituted by the nozzle itself as the nozzle extends through the wall of the pipe 1. However, in other embodiments the nozzle sprays through penetration provided in the wall of the pipe 1 and in such embodiments the outlet end of the nozzle is considered to comprise the wall of the pipe. In many preferred embodiments, the pipe 1 has a circular cross section and in these cases the outlet end 8 of the nozzle 3 is shaped as part of a cylinder. By arranging the outlet end 8 of the nozzle 3 at the same level as the inner surface of the pipe 1 the risk of generating a flow pattern comprising re-circulation and/or other dead flow regions which are not flushed is highly minimized thereby the risk of producing deposits is also minimized.

FIG. 3a also shows that the nozzle 3 is shaped so that the spray of droplet is directed perpendicular to the pipe and into the exhaust stream. Furthermore, the spray is adapted so that the opposite side of the pipe (as seen from the outlet of the nozzle 3) is not sprayed when no flow of exhaust gas through the pipe 1 is present—FIG. 3*a* shows the spraying when no flow of exhaust gas through the pipe is present. FIG. 3*b* shows the shape of the spray when the nozzle 3 sprays into a stream of exhaust gasses flowing from left to right in FIG. 3*b* as indicated by the arrow labelled F. It is seen that the spray is distorted downstream due to the action of the exhaust gasses on the droplets.

FIG. 4 shows schematically a longitudinal cross-sectional view of a further embodiment of embodying a nozzle into a straight part of an exhaust pipe according to the present invention. In the embodiment of FIG. 4 the nozzle 3 is arranged in an elevation 9 provided in the pipe 1. The elevation 9 is shaped as a knob having a smooth outer contour so as to minimize the risk of generating re-circulation and/or dead flow regions around the knob and the outlet of the nozzle 3. Also in this embodiment, the outlet end 8 of the nozzle 3 is shaped and arranged so as to reflect the shape of the inner surface of the pipe 1 so that the outlet end 8 of the nozzle 3 is the same level as the inner surface of the pipe 1 when the nozzle 3 is arranged in the pipe 1.

FIG. 4*a* also shows that the nozzle 3 is shaped so that the spray of droplet is directed downstream into the pipe as the exhaust gasses are going to flow from right to the left (FIG. 4*a* shows the situation where no flow of exhaust gasses is present). Furthermore, the spray is adapted so that the opposite side of the pipe (as seen from the outlet of the nozzle 3) is not sprayed when no flow of exhaust gas through the pipe 1 is present. FIG. 4*b* shows the shape of the spray when the nozzle 3 sprays into a stream of exhaust gasses flowing from right to left in FIG. 4*b* as indicated by the arrow labelled F. It is seen that the spray is distorted downstream due to the action of the exhaust gasses on the droplets.

FIG. 4*c* shows a situation where the spray is directed opposite direction of the exhaust gas flow (the exhaust gasses flow in the direction of the arrow labelled F). In such spray orientations the velocity gradient between drops and gas flow is higher compared to having the spray directed downstream. Due to the larger velocity gradient the heat transfer from gas to drop is increased and the evaporation velocity of the drop is increased. The distance to the catalytic unit can in this case be reduced.

FIG. 4*d* a three dimensional cross-sectional view of the embodiments shown in FIG. 4*a*-*d*.

FIG. 5 shows schematically a longitudinal cross-sectional view of an embodiment of embodying a nozzle into a bend 10 in an exhaust pipe according to the present invention. FIGS. 5*a* and 5*b* show the shape of the spray when no flow of exhaust gasses is present while FIG. 5*c* shows the shape of the spray of the embodiment shown in FIG. 5*b* when a flow of exhaust gasses is present from left to right. In this embodiment, the nozzle 3 is arranged in a knob shaped elevation 9 as in FIG. 4. In FIG. 5*a* the pipe 1 before and after the bend 10 extends straight at least for a distance and the nozzle 3 is arranged in the elevation 9 so that the axis of symmetry of the spray—when no flow of exhaust gasses is present—is aligned with the axis of symmetry of the straight part of the pipe downstream of the nozzle 3 as indicated in FIG. 5*a* (the exhaust gas flows from left to right in FIG. 5*a*).

While the bend 10 of FIG. 5*a* is 90 degrees the bend 10 of FIG. 5*b* is smaller. In such embodiments it may be preferred to arrange the nozzle so that the spray is not aligned with an axis of symmetry of downstream part of the pipe and adapt the spray to not spray onto the opposite side of the pipe 1. Thereby the elevation may be shaped so that the risk of generating re-circulation and/or dead flow regions is minimised.

While FIG. 5*b* shows the shape of the spray 20 when no flow of exhaust gasses is present, FIG. 5*c* shows the shape of the spray 20 when a flow of exhaust gasses is present in the pipe 1 from left to right as indicated by the arrow labelled F. From FIG. 5*c* it is seen that the nozzle is arranged and the spray is adapted so that the spray is distorted in a down stream direction so that the resulting spray is directed in downstream direction.

In many of the preferred embodiments of the present invention, the spray is adapted e.g. so that it does not spray onto the opposite side of the pipe 1. Such adaptation is preferably provided by controlling the momentum of the droplets by controlling the velocity and droplet size of the droplet. This may be accomplished inter alia by controlling the pressure of the fluid flowing towards various nozzle types, and in the following a nozzle arrangement being particular advantageous in this connection will be disclosed.

FIG. 6 is a schematic cross-sectional view of a nozzle 3 according to an embodiment of the present invention. The nozzle 3 which guides fluid from the feeding device, such as a pump with a reservoir for storing a reducing agent such as liquefied urea, to an exhaust gas comprises a tubular shaped channel part 11 having at its inlet a strainer 12 and at its outlet nozzle plate 13. The outlet of the nozzle plate 13 is arranged in a wall of a pipe 1 leading exhaust gasses from a combustion engine to a catalyst. It should be noted that FIG. 6 is not in scale; the longitudinal extension l of the channel part is typically many times larger than the diameter d of the channel part.

The downstream region of the channel part 11 is arranged in the wall of the exhaust pipe 1 in such a manner that thermal contact between said region of the channel part 11 and the pipe wall surrounding the channel part 11 is established. This may be provided in a number of ways, for instance by shaping the channel part 11 and the hole in the exhaust pipe 1 so that the channel part is press-fitted into the wall of the exhaust pipe, or the channel part 11 is welded, soldered, glued, or the like to the wall. In a further embodiment (not shown), a flange adapted to receive the channel part 11 for attachment thereof to the exhaust pipe 1 is applied.

Although, the channel part 11 in the embodiment of FIG. 6 is disclosed as having a constant cross-sectional area throughout its longitudinal extension, the cross sectional area may decrease or increase in the direction towards the outlet plate 13. Furthermore, the cross section may deviate from circular and may be elliptic. However, a cross-section with corners, e.g. square-shaped, is typically less attractive as it may produce re-circulating flow or areas with no flow in or at the vicinity of such corners. When the internal diameter of the channel part 11 is not constant, at least a region of the channel part 11 in the vicinity of the outlet plate 11 should be sufficiently small to assure that a stable liquid-gas interface is generated.

The fluid is discharged through one or more nozzle channels 14 in the nozzle plate 13. The nozzle 3 in FIG. 6 has two converging nozzle channels 14 each extending from the interior surface of the channel part 11 and to the outer surface of the nozzle plate 13. Hereby it is possible to obtain atomization of the first fluid by letting the two jets of fluid impinge one another and hereby form droplets. In another embodiment (not shown) there is only one nozzle channel, and instead the internal diameter of the channel part is so small and the flow into which the reducing agent is introduced has sufficient momentum to disperse the jet emerged from the end of the channel part.

Figure 6:
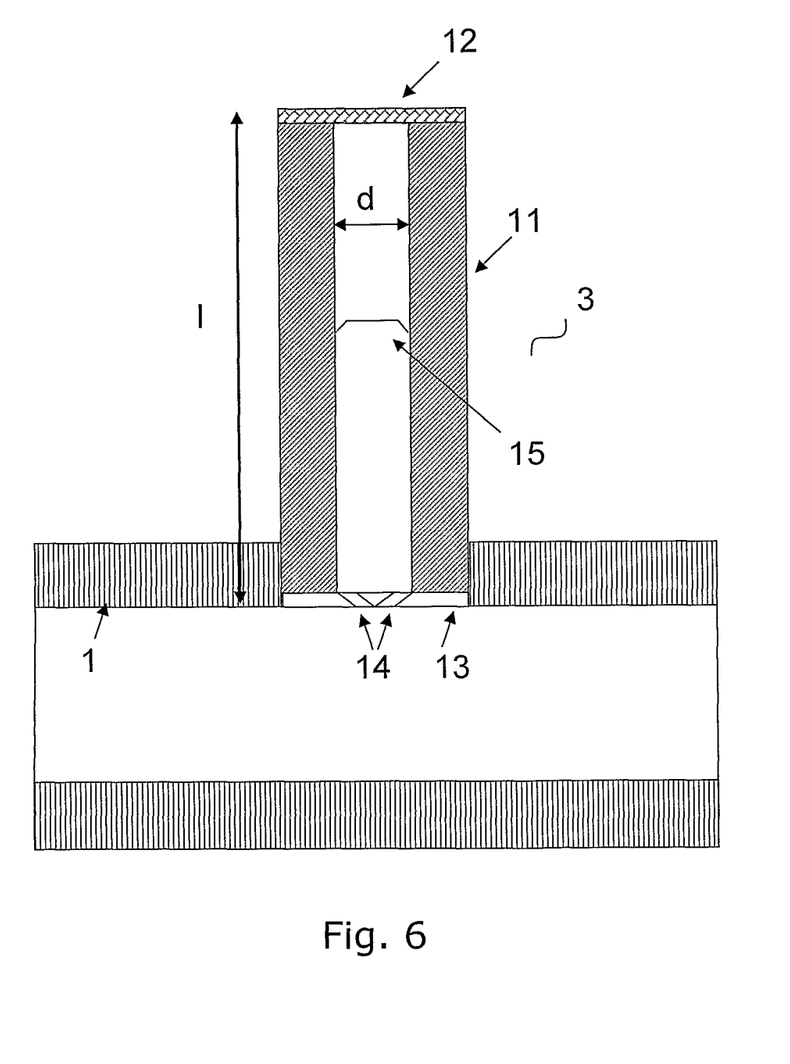
FIG. 6 shows a cross-sectional view of an embodiment in which the length direction of the nozzle is perpendicular to the pipe wall, and the nozzle plate has a blunt angle with the pipe wall.

The nozzle 3 may be equipped with other types of atomization devices than the one shown in FIG. 6. For instance, a venturi-shaped outlet may be applied to the end of the channel part 11 to provide atomization, or the outlet may be shaped as a hollow cone, full cone, flat fan, solid stream atomizer, or the like.

During use of the nozzle 3, the demands for reducing agent will typically vary to a large extent. In order to handle very broad ranges, the feeding of reducing agent through the nozzle 3 is typically done with pulse width modulation, typically so that the flow through the fluid guide stops completely at some instants in time. During these instants where no fluid is flowing through the nozzle 3, heat from the hot exhaust gasses will start to evaporate fluid present in the vicinity of the nozzle plate 13. Thereby a liquid-gas interface 15 will be created above which the fluid is a liquid and below which the fluid is a gas.

The size of the cross section of the channel part 11 is selected so that the surface tension of the liquid-gas interface will be sufficient to keep the liquid-gas interface 15 stable at least when the interface is orientated facing in the direction of the gravity. In other embodiments, the cross section of the channel part 11 is selected so that the interface is stable irrespectively of its orientation relatively to the gravity.

The presence of a gas comprising reducing agent may have a tendency to create deposits on interior surfaces of the downstream end of channel part 11 and on the surface of the nozzle plate 13 facing upstream. However, such deposits are removed either as the temperature in the regions of the deposits reaches the decomposition temperature of the deposits, or the deposits are decomposed or eroded when liquid flows pass these regions during a pulse, by purging off the evaporated liquid or a combination thereof.

Boiling of reducing agent will create large volumes of gas (the expansion factor is greater than 1000), and this large volume of gas will escape through the nozzle channels 14 and purge the gas filled part of the fluid guide. This purging reduces the amount of material, e.g. urea, in the gas filled part of the fluid guide that may create deposits to an amount that this is too small to make disturbing deposits As mentioned above, feeding of reducing agent into the exhaust system is typically done in a pulse width modulated manner. Typically, the pulse width modulation is divided into periods where no fluid is fed to the channel part and periods wherein fluid is fed into the channel part. During a first period, fluid is flowing through the outlet resulting in a cooling of the channel part in the vicinity of the exhaust pipe. When the fluid flow is stopped in a succeeding second period, heat from the exhaust gasses and the exhaust pipe will start to heat up fluid present in the channel part. If the duration of the second period is sufficiently long, the fluid being present in the channel part in the vicinity of the exhaust pipe will boil and evaporate out of the nozzle channels, and the interface be created and travel upstream in the channel part.

When fluid is fed to the channel part during a succeeding pulse, the liquid will move the interface downstream in the channel part and down to the nozzle channels where after liquid will flow through the nozzle channels 14.

Figure 7:
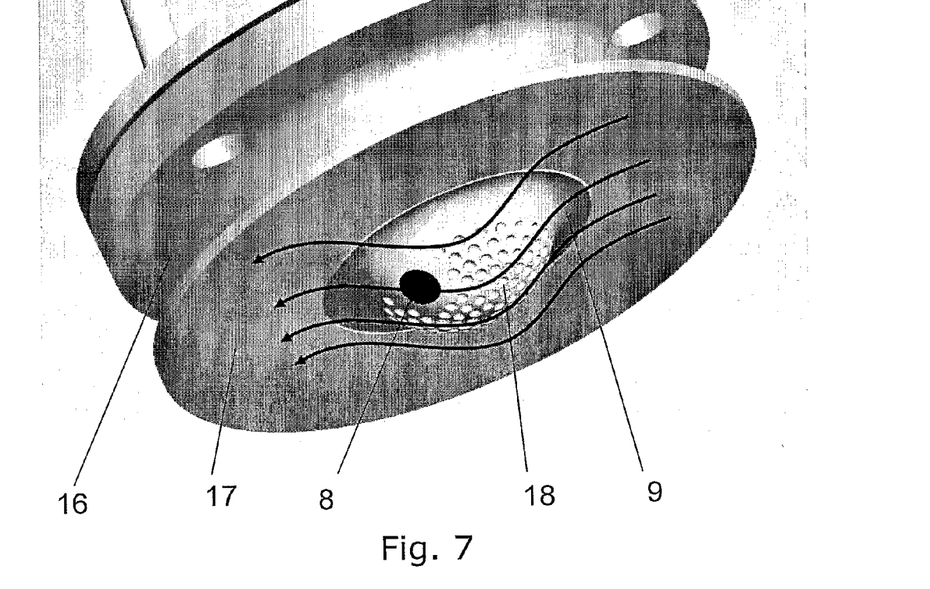
FIGS. 7 and 8 show each preferred embodiment of nozzle tips according to the present invention.
Figure 8:
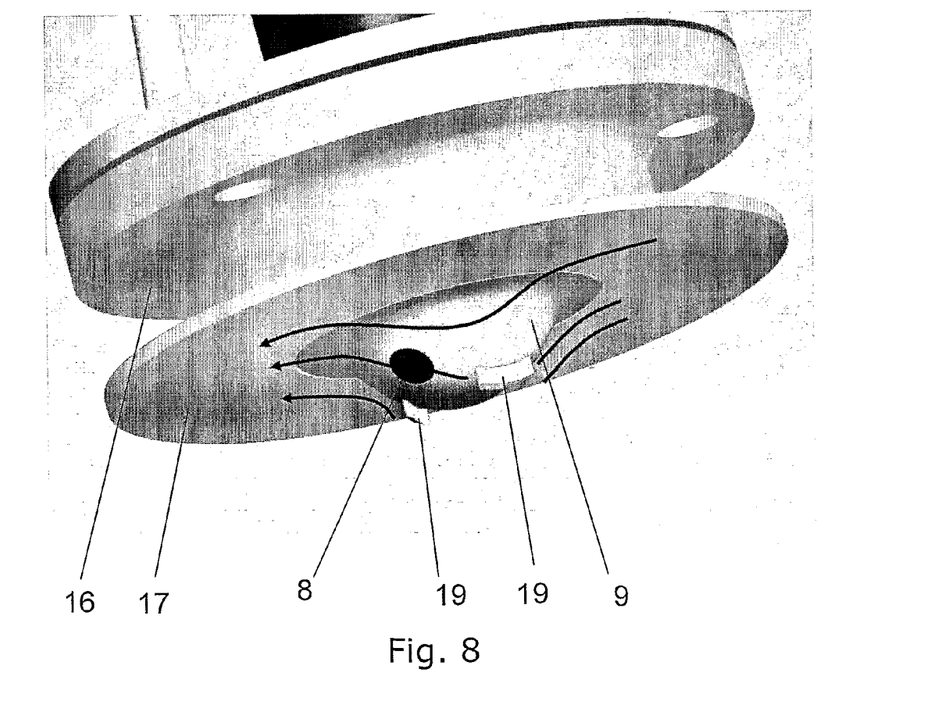

FIGS. 7 and 8 shows two embodiments of elevations 9 wherein a nozzle 3 is arranged. The embodiments comprises a fixating structure 16 which are fixated to the wall of the exhaust pipe 1. The surface 17 of the fixating structure 17 is arranged flush with the interior wall of the exhaust pipe 1. The outlet end 8 of the nozzle 3 is arranged at a position of the surface of the elevation 9 which points downstream when exhaust gas is flowing past the elevation 9 (the fluid flow when no spraying from the nozzle 3 is present is indicated by arrows in the figures).

In FIG. 7 a number of indentations 18 are provided in the surface of the elevation 10 which indentation stabilised the boundary layer of the flow along the surface of the elevation 9 so as to minimise the risk of detachment of the flow.

In FIG. 8 two flow guides acting as vortex generators 19 are arranged upstream of the outlet end 8 of the nozzle to guide the flow towards the outlet end 8 of the nozzle and stabilise the boundary layer flow so as to minimise the risk of detachment of the flow.

It is noted that the indentations 18 and the flow guides 19 may be provided in/at the surface surrounding the outlet end also in cases where the outlet end is not arranged in an elevation 9, e.g. be provided in the wall of the exhaust pipe 1 surrounding the outlet end 8 in the embodiment shown in FIG. 3.

Figure 9:
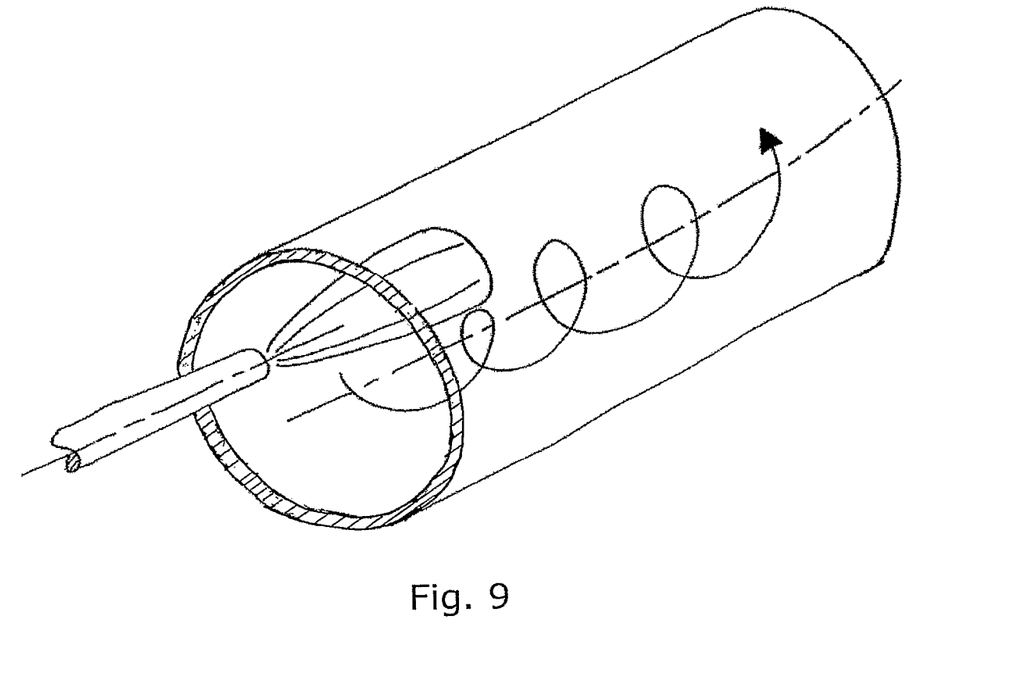
FIG. 9 shows schematically the introduction of a reducing agent, preferably being liquefied urea, into a stream of exhaust gasses streaming in a vortex pattern.

In FIG. 9 a straight exhaust pipe having a tangential and axial mowing gas flow is displayed. The spray can be orientated parallel or angled in relation to the exhaust pipe, but offset from the centre. Having the spray placed offset from the centre provides a larger velocity gradient between drops and gas flow and thereby faster conversion to ammonia. As the drops are converted the ammonia is picked up by the tangential gas flow. Due to the gradual conversion the ammonia ends up being homogeneous distributed over the cross section of the exhaust pipe.

Even though the invention has been described with respect to the second fluid flowing in a pipe, it is also possible within the scope of the invention that the second fluid may flow in any other type of closed compartment. It is also covered within the scope of the invention that the second fluid flows along any wall on which the nozzle is mounted. This means that the fluid does not necessarily flow within a closed compartment.

The invention has been disclosed with reference to an atomization principle according to which the liquid is atomized by two jets of liquid impinge each other. However, the invention is also applicable in connection with other atomization principles.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A system for a combustion engine comprising a pipe through which an exhaust fluid flows, a portion of a wall of the pipe forming a dome-shaped elevation which extends into a flow path of the fluid and
a nozzle arranged in the dome-shaped elevation, the dome-shaped elevation comprising a negative incline in a direction of fluid flow and in a direction perpendicular to the direction of fluid flow converging to a maximum, wherein the dome-shaped elevation does not extend along the entire circumference of the pipe, the nozzle aligned to point in a direction that is not perpendicular to a rectilinear inner surface of the pipe, the nozzle adapted to atomize a liquid that crystallizes upon contact with the fluid flowing through the pipe, wherein said nozzle is adapted to introduce the liquid through one or more outlets into the pipe, and wherein the nozzle is arranged so that the region being sprayed or the mixing region, wherein a mixing between the liquid being atomized by the nozzle and the fluid flowing in the pipe occur, are flushed by fluid flowing through the pipe, wherein the nozzle is aligned to point into the region being sprayed and the mixing region.

2. The system according to claim 1, wherein an outlet end of the nozzle is shaped and arranged to reflect the shape of the inner surface of the pipe so that the outlet end of the nozzle is at the same level as the inner surface of the pipe.

3. The system according to claim 1, wherein the nozzle is arranged to spray in a downstream flow direction of the fluid flowing in the pipe.

4. The system according to claim 1, wherein the nozzle is arranged to spray in upstream flow direction of the fluid flowing in the pipe.

5. The system according to claim 1, wherein the nozzle is arranged in a region of the system, wherein the temperature of the wall of the pipe is higher than the evaporation temperature of the liquid to be atomized.

6. The system according to claim 5, wherein the liquid to be atomized is liquefied urea and the temperature is larger than 152° C.

7. The system according to claim 1, wherein the one of more outlets are surrounded by a corrugated surface that stabilizes the boundary layer of the fluid flow in the pipe in the vicinity of the outlet(s).

8. The system according to claim 1, wherein one or more flow guides are arranged upstream of the one or more outlets to guide the flow towards the one or more outlets and to stabilize the boundary layer of the fluid flowing in the pipe in the vicinity of the outlet(s).

9. The system according to claim 1, wherein one or more flow guides are arranged upstream of the one or more outlets and said flow guides are configured to generate a vortex.

10. The system according to claim 1, wherein the one or more outlets are arranged flush with the wall of the pipe.

11. The system according to claim 1, wherein the dome-shaped elevation has a negative incline, which completely surrounds a maximum of the dome-shaped elevation.

12. The system according to claim 1, wherein the dome-shaped elevation has a smooth outer contour so as to minimize the risk of generating re-circulation and/or dead flow regions around the knob and the one or more outlets of the nozzle.

13. The system according to claim 1, wherein the nozzle is arranged off-center in the dome-shaped elevation.

14. The system according to claim 1, wherein the nozzle is arranged between an elevation maximum of the dome-shaped elevation and the pipe.

15. The system according to claim 1, wherein the dome-shaped elevation has a single elevation maximum surrounded by a declining shape.

16. A system for a combustion engine comprising:
a pipe through which an exhaust fluid flows, a portion of a wall of the pipe forming a dome-shaped elevation which extends into a flowpath of the fluid, the dome-shaped elevation being positioned in a region of the pipe having a uniform diametrical cross-section along the length of the pipe, wherein the dome-shaped elevation comprises a negative incline which completely surrounds a maximum, wherein the dome-shaped elevation does not extend along the entire circumference of the pipe; and
a nozzle arranged in the dome-shaped elevation, the nozzle adapted to atomize a liquid that crystallizes upon contact with the fluid flowing through the pipe, wherein said nozzle is adapted to introduce the liquid through one or more outlets into the pipe, and wherein the nozzle is arranged so that a region where mixing between the liquid being atomized by the nozzle and the fluid flowing in the pipe occurs, is flushed by fluid flowing through the pipe.

17. The system according to claim 16, wherein the nozzle is aligned to point in a direction that is not perpendicular to a rectilinear surface of the pipe, wherein the nozzle is aligned to point into the region being sprayed and the mixing region.

* * * * *